United States Patent [19]
El-Kadi et al.

[11] Patent Number: 6,014,642
[45] Date of Patent: Jan. 11, 2000

[54] SYSTEM FOR BENEFITS PROCESSING

[75] Inventors: Khaled El-Kadi, Chester; Larion Derienzo, Neshanic Station, both of N.J.

[73] Assignee: Merrill Lynch & Co, New York, N.Y.

[21] Appl. No.: 08/642,918

[22] Filed: May 6, 1996

[51] Int. Cl.[7] ................................................. G06F 17/60
[52] U.S. Cl. ............................................................. 705/36
[58] Field of Search ........................................ 705/35, 36

[56]         References Cited

U.S. PATENT DOCUMENTS

| | | |
|---|---|---|
| 4,346,442 | 8/1982 | Musmanno . |
| 4,376,978 | 3/1983 | Musmanno . |
| 4,597,046 | 6/1986 | Musmanno et al. . |
| 4,674,044 | 6/1987 | Kalmus et al. ............................ 705/37 |
| 4,700,297 | 10/1987 | Hagel, Sr. et al. . |
| 4,774,663 | 9/1988 | Musmanno et al. . |
| 5,038,284 | 8/1991 | Kramer .................................... 705/37 |
| 5,258,908 | 11/1993 | Hartheimer et al. ..................... 705/37 |
| 5,270,922 | 12/1993 | Higgins .................................... 705/37 |
| 5,297,032 | 3/1994 | Trojan et al. . |
| 5,418,888 | 5/1995 | Alden ....................................... 706/48 |
| 5,749,077 | 5/1998 | Campbell ................................. 705/36 |
| 5,819,237 | 10/1998 | Garman .................................... 705/36 |

OTHER PUBLICATIONS

Fritz, Micheal, "Do–it–yourself IRAs", Forbes Magazine, p. 206–7, Jun. 25, 1990.
Hansell, Saul, Information Management: Bonfire of the Securities, Institutional Investor, pp. 173–175, May 1990.
Downes, John, Dictionary of Finance and Investment Terms, Barron's Educational Series, Inc., pp. 556, 564, 602, 648, 1995.
Computer Dictionary, Microsoft Press, pp. 59, 1994.

*Primary Examiner*—Edward R. Cosimano
*Attorney, Agent, or Firm*—Hopgood, Calimafde Kalil & Judlowe

[57]                ABSTRACT

A benefits processing system is provided in which a central benefits processor is interconnected with continually updated databases containing such information as available investments, pricing information, commission schedules, and dividend information. To make all investments available to participants, the system uses a unique two-byte binary code for each investment. Through the use of dollar cost averaging, whole or part shares of any investment traded on any exchange or over-the-counter may be purchased as part of the plan. Various system modules for automatically handling support tasks are provided, in addition to modules created to handle new tasks previously unavailable in such benefits plans.

16 Claims, 6 Drawing Sheets

SYSTEM FOR BENEFITS PROCESSING

FIELD OF THE INVENTION

This invention relates generally to a system for recording, maintaining and processing investment information. More specifically, this invention relates to a system for processing investment information, participant data and financial transactions with respect to employee benefits programs.

BACKGROUND OF THE INVENTION

Since Congress passed Section 401(k) of the Internal Revenue Code relating to employee benefits programs, the use of such "401(k)" programs has skyrocketed. In 1995 alone, over half a trillion dollars were invested through such programs. With much of the money coming from automatic employee payroll deductions, the flow of cash into such programs is relatively steady and continuous. Considering the high volume and predictability of flow into the programs, setting up and managing the programs has become a lucrative segment of the investment banking industry. Also due to the high volume, the need for processing and tracking information relating to the investments has also presented logistic problems.

To eliminate such problems, the investment industry quickly realized that by limiting the number of investments available to 401(k) plan participants, the resulting record keeping and processing requirements necessary to maintain the plan are kept to a minimum. Most updating processes can be and have been accomplished manually in a cost-efficient manner with such a limited selection of investments.

Even with automation of some of the record keeping responsibility of plans, much of the work is still done manually. This is evidenced by the fact that the prior commercially available systems for running 401(k) plans were severely limited in the number of investments they could offer. Few plans offer more than a handful of investments, with each investment being a different stock, mutual fund or other type of investment.

The growth of 401(k) plans has also meant a larger segment of the population has purchased investments, rather than the more traditional savings accounts, with a parallel rise in the investing savvy of the general population. Given the thousands of investments available on the U.S. exchanges, combined with those traded over the counter, providing less than ten choices to a participant eliminates a wealth of investing options that are otherwise available under the 401(k) statutes and regulations.

One of the common systems used today for tracking and processing benefits plans is the Omniplan Benefits Processing Software of Sungard Corporation of Birmingham, Ala. The Omniplan software in its standard configuration is limited to 400 combinations of investments and money sources. There are various money sources for participants, including, but not limited to, before-tax contributions, after-tax contributions and company contributions. The architecture of the Omniplan software makes it impossible to increase the number of combinations beyond 600. Obviously, there are many more than 600 investments available for purchase, so the Omniplan software is inherently incapable of handling a complete menu of investments.

The industry has not limited participants' choices up to now without good reason. Increasing the number of available investments, and thus the number of investment-money source combinations makes various support tasks either logistically impossible or so cost-intensive as to make the plan not profitable for the financial institution running the plan. Assuming, generally, that the plan records are stored on a computer, these support tasks include, but are not limited to, entering and maintaining the information on the available investments, tracking and crediting dividends, tracking investment pricing, and commissions calculations.

SUMMARY OF THE INVENTION

In view of the foregoing deficiencies of the prior art, it is an object of the invention to provide an improved system for benefits processing that permits plan participants to invest in any investment that is traded on any exchange or over the counter.

It is another object of the invention to provide a benefits processing system that automatically keeps track of available investments for purchase.

It is a further object of the invention to provide a benefits processing system that automatically scans for, creates and then posts transactions for any dividends that are due participants.

It is yet another object of the invention to provide a benefits processing system that automatically uses updated investment pricing for transactions such that accounts will be processed with the most accurate price during any interim updates.

It is a still further object of the invention to provide a benefits processing system in which corporate actions taken with respect to any investments in any plan are stored and handled as transactions.

It is still another object of the invention to provide a benefits processing system that automatically handles trades taking into account the market settlement regulations for each individual investment, thus avoiding any exposure on the part of the recordkeeper.

It is a yet further object of the invention to provide a benefits processing system that will parse a disbursement transaction, if necessary, if any of the investments contained in the transaction are not traded on that day.

It is yet another object of the invention to provide a benefits processing system in which commissions are automatically calculated for any trades such that the highest possible level of activity is achieved for the participant's benefit.

To achieve these objects, a benefits processing system is provided in which a central benefits processor is interconnected with continually updated databases containing such information as available investments, pricing information, commission schedules, and dividend information. To make all investments available to participants, the system uses a unique two-byte binary code for each investment. Through the use of dollar cost averaging, whole or part shares of any investment traded on any exchange or over-the-counter may be purchased as part of the plan. Various system modules for automatically handling support tasks are provided, in addition to modules created to handle new tasks previously unavailable in such benefits plans. For example, the system of the present invention is programmed with all the pertinent market settlement regulations. Whenever a transfer is requested between two investments in which the settlement period is longer than zero days, the participant's account is not credited with the buy portion of the trade until settlement of the sell portion.

BRIEF DESCRIPTION OF THE DRAWINGS

The foregoing and other objects and advantages will become apparent to those skilled in the art upon reading the following detailed description of the preferred embodiment in conjunction with a review of the appended drawings, in which.

DETAILED DESCRIPTION OF THE PREFERRED EMBODIMENTS

Figure 1:
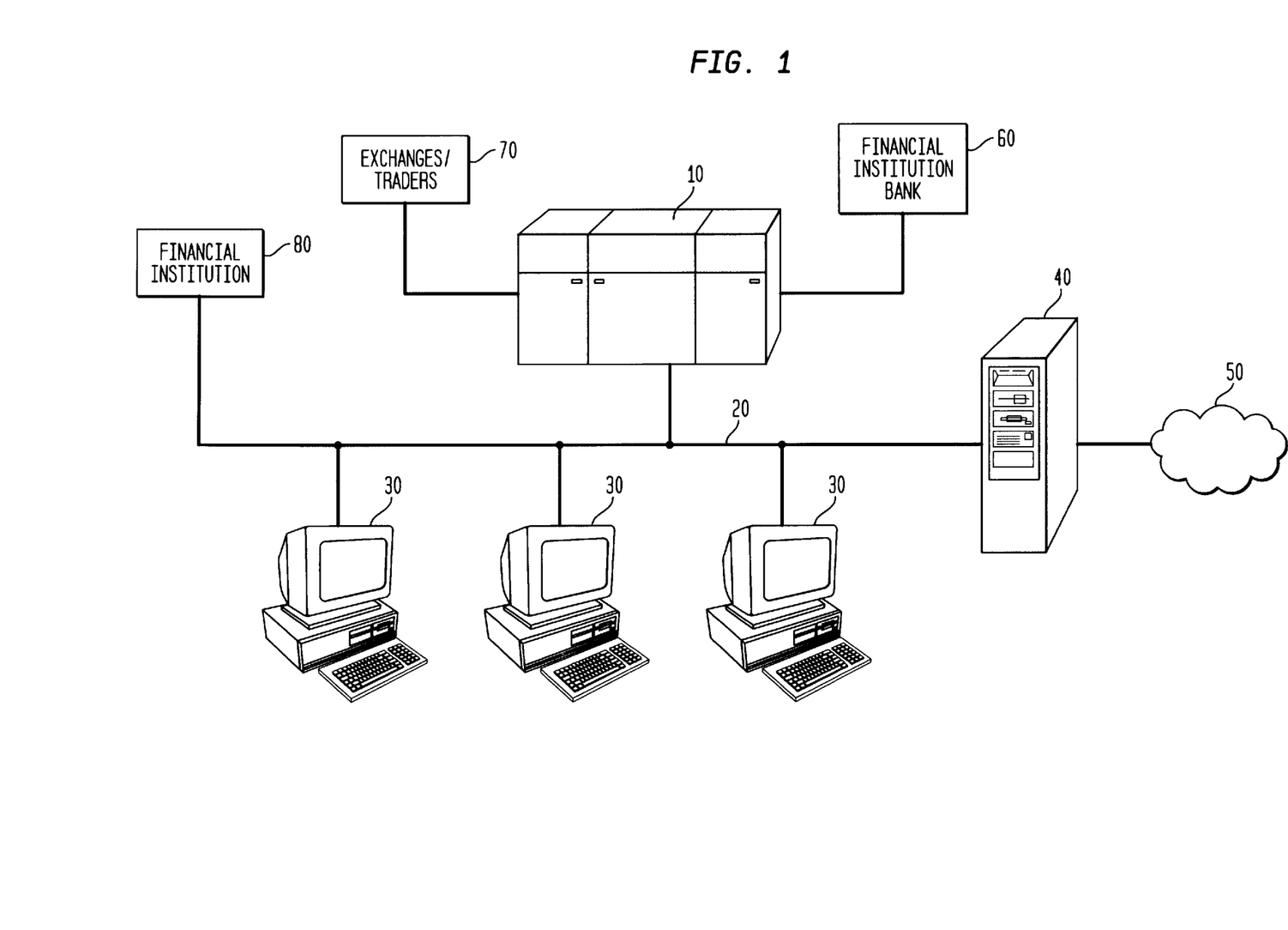
FIG. 1 is a schematic diagram of the overall system architecture of the system of the present invention.

Referring now to FIG. 1, an overall system hardware architecture is shown. Essentially, the main processing components and main data storage of the system are resident on a central computer 10 which is connected to a computer network 20. Preferably, the central computer 10 is comprised of an IBM ES/9000-860, operating at 202.5 MIPS with 98 channels, while the network 20 is a Novell environment. Of course, other computer and network configurations will work similarly. Providing access to the main processor and data storage are a plurality of terminals 30 connected over the network 20. Each terminal is preferably, at a minimum, a 486/33 IBM-compatible with 16 megabytes of RAM and a 15-inch SVGA monitor. These terminals are within the financial institution that is the recordkeeper for the retirement plan and provide limited or total access to the system functions, based on a password-type security system. For users of the system, such as certain plan administrators, outside of the financial institution, a gateway 50 is provided for dialup or internet access. As part of the gateway 50, a security firewall 40 is installed on the network 20, as is known. It is contemplated that plan participants may have direct access to the system for effecting transactions.

For purposes of this description, "plan" will refer to the benefits program of a single employer. Each plan has a number of participants, who are the employees contributing to the plan. "User" refers to a person, usually within the financial institution, that has direct access to the system through a terminal. "Recordkeeper" refers to the financial institution.

The central computer 10 has access to other systems of the financial institution 80 over the network 20. These connections provide access to information necessary to the proper and efficient functioning of the system of the present invention. A connection also exists to the constituent bank 60 of the financial institution, which allows for automatic handling and recording of incoming investment money, as well as disbursements to participants who may liquidate any portion or the entirety of their plan holdings. The central computer 10 is also connected to the exchanges or over-the-counter traders 70 of the financial institution. In that way, buy or sell orders for particular investments may be automatically generated by the system and then carried out by the appropriate traders.

I. System Architecture

On a fundamental level, the system of the present invention is superior to existing benefits processing systems in that it allows for all investments traded on the exchanges or over the counter to be available for purchase by plan participants. The limit of several hundred in existing systems has been eliminated, to where, in the preferred embodiment, the system allows for tens of thousands of possible investments to be processed within the system. This is accomplished by altering the way in which investments are designated by the system. In prior systems, since the number of investments was limited, it was sufficient to tag each investment with a two-character code. Each character was selected from one of the alphanumeric characters of the standard EBCDIC code set, minus various control codes. This resulted in a physical maximum of nearly 1200 investments with several thousand corresponding investment-money source combinations. Since every action taken by the prior system, other than simple participant profile information processing, inevitably involves at least one investment, the use of the two-character codes was pervasive in known systems. In addition to the above physical limit, however, prior systems also have an architectural limit of 600 combinations, due to the basic design of their memory allocation.

In the system of the present invention, the two-character code has been replaced with a two-byte binary code, which is therefore capable of tens of thousands of unique identifiers (preferably 30,000), resulting in over a million investment-money source combinations. With previous systems, the architecture consisted of a single investment table with 600 rows, each row representing an investment-money source combination, so even if the old system were switched to a two-byte binary code, the system would still be limited to 600 investment-money source combinations. With the redesigned fundamental architecture and improved memory management capabilities of the present invention, multiple tables, each having 600 rows, are made possible. The number of tables can be increased as needed, resulting in an unlimited number of investment-money source combinations, i.e., no architectural limit. The system is designed to maintain the multiple tables in adjacent memory positions, with all table reading/writing functions throughout the system being redesigned to search and access not only a single table, but all of the tables. In this way, the present system architecture can store an unlimited number of combinations.

In addition to the various system-level changes this precipitates, the various submodules must be altered to handle binary identifiers. As mentioned above, this requires extensive changes throughout the system, such as the on-line screen displays that previously identified investments with two character codes. Displaying the new two-byte binary code would often be unintelligible to the user. In the present system, place-holding codes are displayed instead. When the user places the cursor over the place-holding codes and presses the appropriate key, a pop-up window displays the name of the investment, or allows an investment to be entered.

Due to this extensive rearchitecture of the system, many auxiliary support tasks that were either performed manually, or by a combination of manual and automatic processing, would have become so unwieldy as to make the benefit of increased choice for the participants overshadowed by the immense costs incurred by the recordkeeper and make the overall system not worth implementing. Thus, other portions of the system besides the ability to handle more investments have been improved over those existing in the prior art, or are completely new compared to existing systems. These submodules will be discussed in turn, along with a discussion of the prior systems and their drawbacks.

II. First-time Investment Purchases

In existing systems, before a participant could invest in a particular investment, assuming that the plan administrator had chosen to even offer that investment, the administrator needed to manually add the investment to the processing system. This required manually inputting all the investment-related information necessary to carry out any transactions with respect to that investment. With only a limited number of available investments, even as few as three, this task was, at most, a brief task. However, since the information was manually entered, it could often happen that the investment information would be entered incorrectly, causing errors for any subsequent transactions until the problem was corrected.

With the system of the current invention, in which a participant, at any time, may request the purchase of any investment, manually entering the data for each investment on request would be practically impossible. This does not even take into account the new investments that are created in the market on a daily basis, all of which are available for investment by a participant.

To accommodate this large number of investments, the system of the present invention includes a submodule (see FIG. 2, block 200 and FIG. 3) having a component database, resident on the central computer 10, called the Investment Control Data Base (ICDB). This database stores all of the necessary investment information (including, but not limited to, the ticker symbol, investment type, CUSIP number, investment name, accounting method, exchange, transfer rules and settlement days) for all investments currently on the market. To remain current, the ICDB is updated on a regular basis through a network connection to the financial institution (functional block 300), which maintains an up-to-date investment database.

Figure 3:
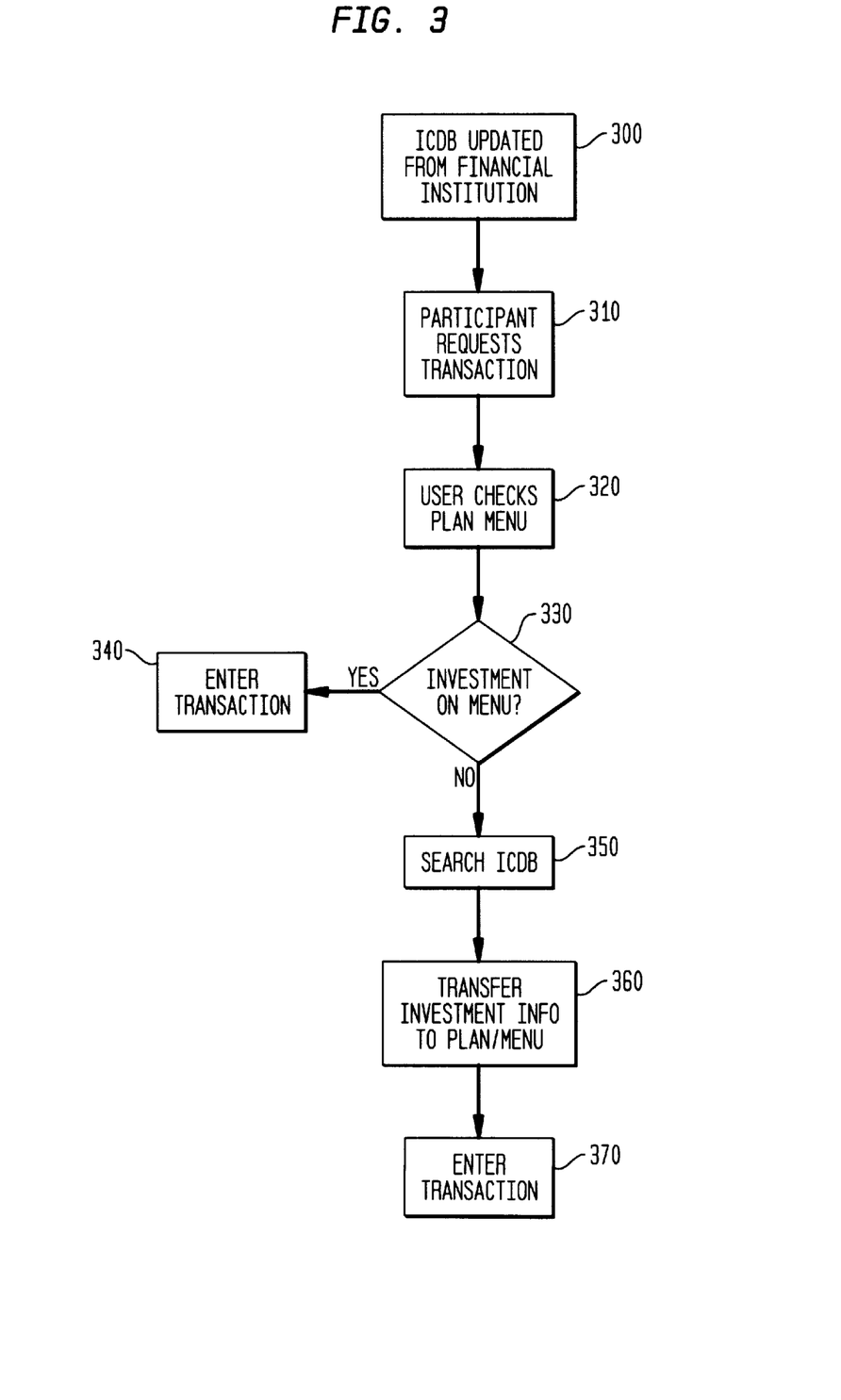
FIG. 3 is a functional schematic flowchart of the system submodule for processing new investments to a plan.

Given that the system is capable of handling multiple plans, some of which may have a relatively few participants invested in a small subgroup of all available investments, it would be redundant for each plan to automatically have access to, and investment information stored for, every investment in the ICDB. Thus, as a participant requests investment in a particular investment for the first time in a plan, it is added to that plan. A user inputting the request for investment (block 310) may attempt to select the investment from a pull-down menu (block 320). If the investment is on the menu (block 330), the transaction may be entered (block 340). If the investment cannot be found on the menu (block 330) and is not already loaded in the plan, the user may initiate a search function to search the ICDB for an investment matching the market code, name or partial name already entered (block 350). Assuming a match, the user selects the found investment. The system then automatically transfers the necessary investment information from the ICDB into that plan's database and adds that investment name to the available investment menu for instant access the next time a participant requests a transaction involving that investment (block 360). The user may then enter the transaction (block 370).

It is also to be understood that the system of the present invention uses dollar cost averaging, in which participants invest a fixed dollar amount on a periodic basis. Over time, this results in lower average share price. It also means that the present system must be, and is, capable of processing fractional share transactions.

III. Dividend Processing

With existing benefits systems, any dividend disbursements are manually entered into the system for each investment available on the system. Such information as the pay date, dividend amount, and dividend type (cash, stock, etc.) are all entered manually and are then processed for any participants holding that investment. The allocation of such dividends for all investments in a plan, for example, to be reinvested in the same investment or another, is also entered manually and applies to all participants in the plan.

In the system of the present invention, to accommodate the tens of thousands of investments that are available, the dividend process has been improved with a submodule (see FIG. 4) to eliminate the need for manual processing. Over the network, the central computer accesses the financial institution's existing dividend processing database, which contains up-to-date information on dividend activity for all investments based on the announced dividends (block 400). On a daily basis, the system scans the dividend processing database (block 410) and creates its own internal dividends database (DDB) (block 420) containing a list of funds with the dividend rates and payable dates. The system then scans all participants' holdings (block 430) on all plans in the system and creates a dividend transaction (block 460) for each dividend-paying investment in the appropriate amount and posts it to the participant's account. For investments not paying dividends, no transaction is created (block 440).

Figure 4:
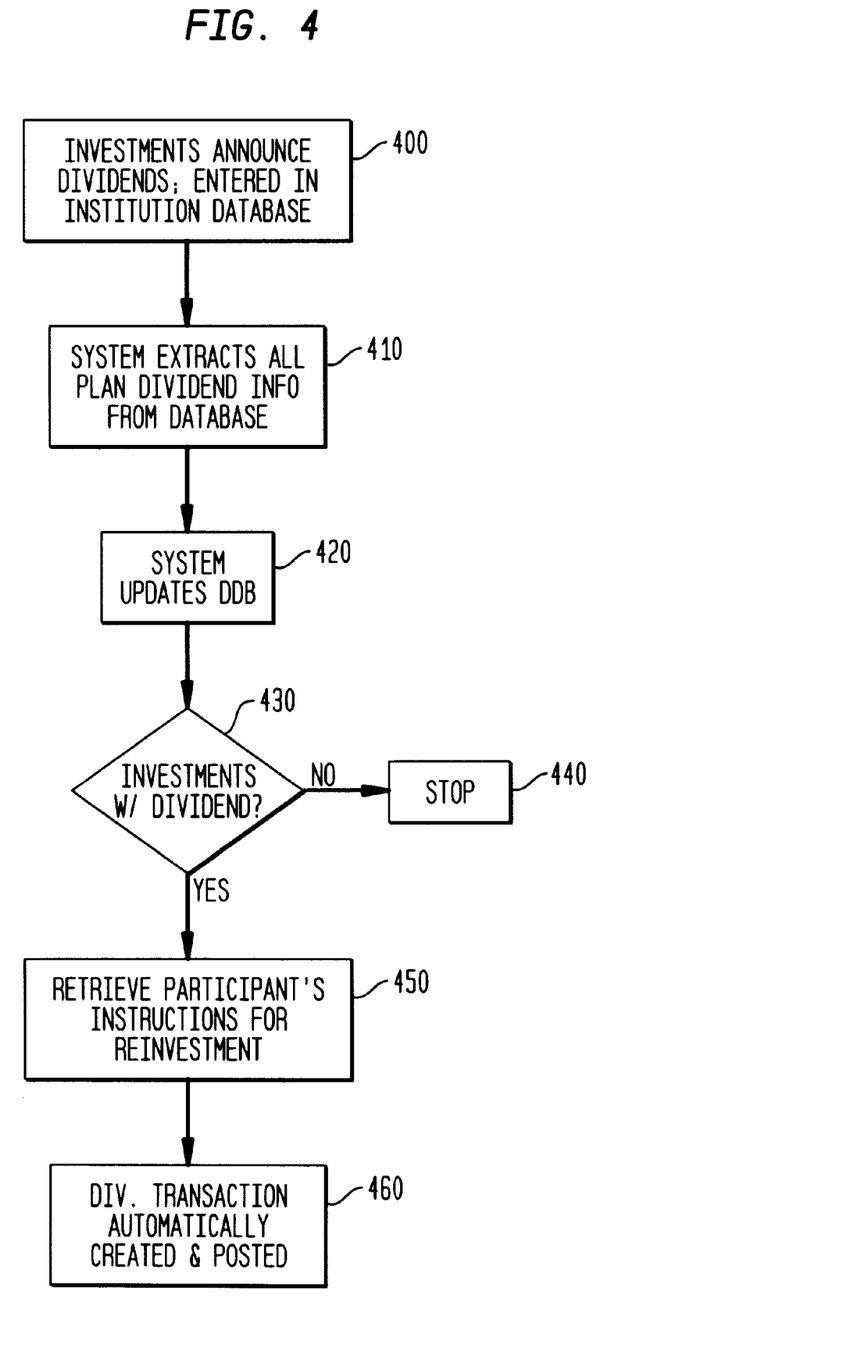
FIG. 4 is a functional schematic flowchart of the system submodule for dividend processing.

Further, because of the improved processing of the dividend transactions, dividend reinvestment options are now selected at the participant level. For each participant, his/her individual profile will include instructions as to the proper designation of any dividends, which allows them to direct dividend proceeds into the investment or fund of their choice. Of course, these instructions can be modified at any time by the participant. Thus, before the submodule creates each dividend transaction, it retrieves the particular participant's instructions regarding reinvestment from his/her profile stored on the central computer (block 450) and routes the transaction accordingly.

IV. Forward Pricing

With existing systems, whenever a transaction takes place with respect to a particular investment, the user would attach a price card to the transaction, which would include the latest price for that investment (normally the last trading price from the night before). This would ensure that the transaction was made with the most accurate price possible so that any intra-day simulated update runs on the plans' accounts are as accurate as possible. As a result, when the plans are reconciled with the financial institutions' trust accounts and records at the close of business, any difference due to price fluctuations will be minimized. Existing systems track and store these prices for all funds in their plans throughout the day as trading occurs, up to the last price of the evening.

In the system of the present invention, performing the same operation in the same manner would require literally thousands of manual price entries per day, since not only are there more available investments, but the increased flexibility and functionality of the present system will likely increase the frequency of participant-driven transactions. Although these entries are automatic, such high volume would cause poor system performance. Thus, the system includes a submodule that creates a forward price table using the last price from the previous evening stored by the system. The table contains a "forward price" for all investments. Whenever a transaction involving an investment is requested, the system automatically retrieves the forward price from the price table (block 230, FIG. 2) for that investment and uses that price for any intra-day simulations. This eliminates the need for a user to enter a price for a particular transaction. The transaction is completed, posted to the participant's account and the plan records with the actual trading price and related transaction information (block 240).

V. Corporate Actions

In existing systems, with much of participants' investments being in a small group of funds or stocks, the frequency with which any type of corporate action will have any effect on the plan's holdings is relatively small compared to day-to-day transactions and even dividends. Thus, it is a minor task to keep track of any corporate actions and/or participant's responses, especially when many of the investments are managed, grouped funds that handle corporate actions without input from the investors.

The current system multiplies immensely the potential workload associated with respect to corporate actions, not only due to the increase in available investments, but also due to the fact that participants can now invest in any individual investments, rather than grouped funds. This means that the individual participant is much more likely to need to respond to a corporate action. To compensate for this potential workload, the system of the present invention includes a submodule (see FIG. 5) for handling corporate actions as a transaction. The transaction can handle any corporate action, including, but not limited to, cash tender offers, share tender offers, security exchanges, granting of rights to securities, abandonment of securities and cash distributions related to class action settlements.

Figure 5:
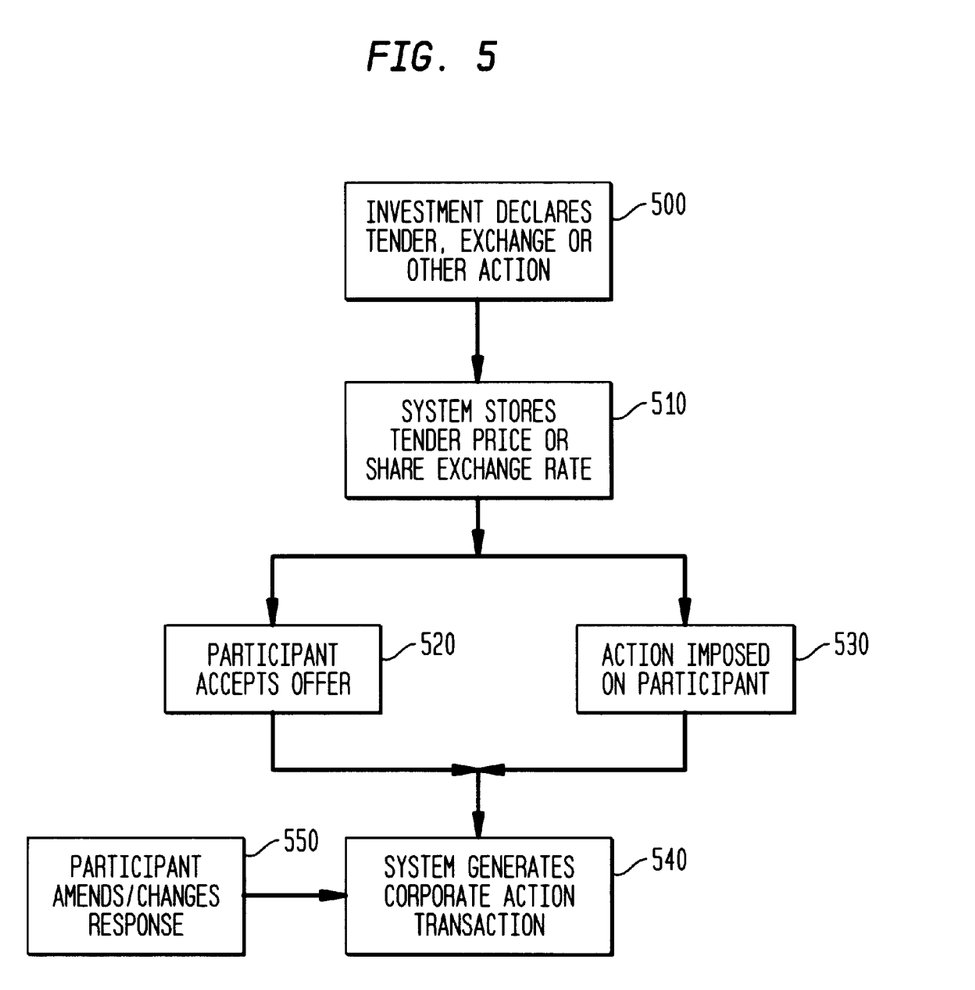
FIG. 5 is a functional schematic flowchart of the system submodule for corporate action processing.

To accomplish this, the system stores for each corporate transaction any tender prices or share exchange rates (block 510). These can either be specified by the terms of the corporate offer or initiated by the participant, depending on the type of corporate action (block 500). In both cases, they are preferably entered by a user, although direct access by both employers and participants is contemplated. The system then also stores all participants' elections regarding outstanding corporate actions on securities owned by them and records the elections in a table on the central computer (block 520). The system also records any actions imposed on the participant without response (block 530). With this data table stored, a participant can revoke or alter, in whole or in part, his/her response to an outstanding action before its appropriate deadline, for example, by rejecting a cash tender offer previously accepted by him/her (block 550). The system would then create a new transaction with the new instructions resulting in a corporate action transaction in keeping with the participant's intentions (block 540).

VI. Pending Trades

One of the most important features of the system to any financial institution using the system of the present invention is its unique capability of handling pending trades. It is well known in the industry, and is dictated by various market regulations, that different investments have different settlement periods. It is also known that in transactions outside of the benefits field, transactions will often arise in which the combinations of investments being bought and sold have a significant settlement period. This does not often happen with benefits plans that offer a limited selection of investments, often only mutual funds, or plans that have limited transfers within the plan between the various available investments.

With all investments available to participants in the present system and more frequent intra-plan transactions between investments of different types, the problem of different settlement periods can result in financial exposure for the financial institution. For example, when a participant sells a stock investment to buy a dissimilar investment, such as a mutual fund or money market fund, within his account, the stock sale takes three days to settle in the market. This means that the cash proceeds to purchase the other investment are not available to the plan until the third day. With previous systems, which do not recognize market settlement regulations, the sell and the buy take place in the participant's records on the same day. This creates differences between these records and the plan trust account, which results in significant financial exposure for the financial institution. Users of existing systems often compensate for this by unitizing the stock funds with a significant cash cushion, in which prices are determined according to trading volume and other parameters. Unfortunately, this denies the participant the best possible price on both the sell and buy ends of the transaction. Outside of benefits processing, brokers manually hold off any "buys" until the appropriate "sells" have settled.

Figure 6:
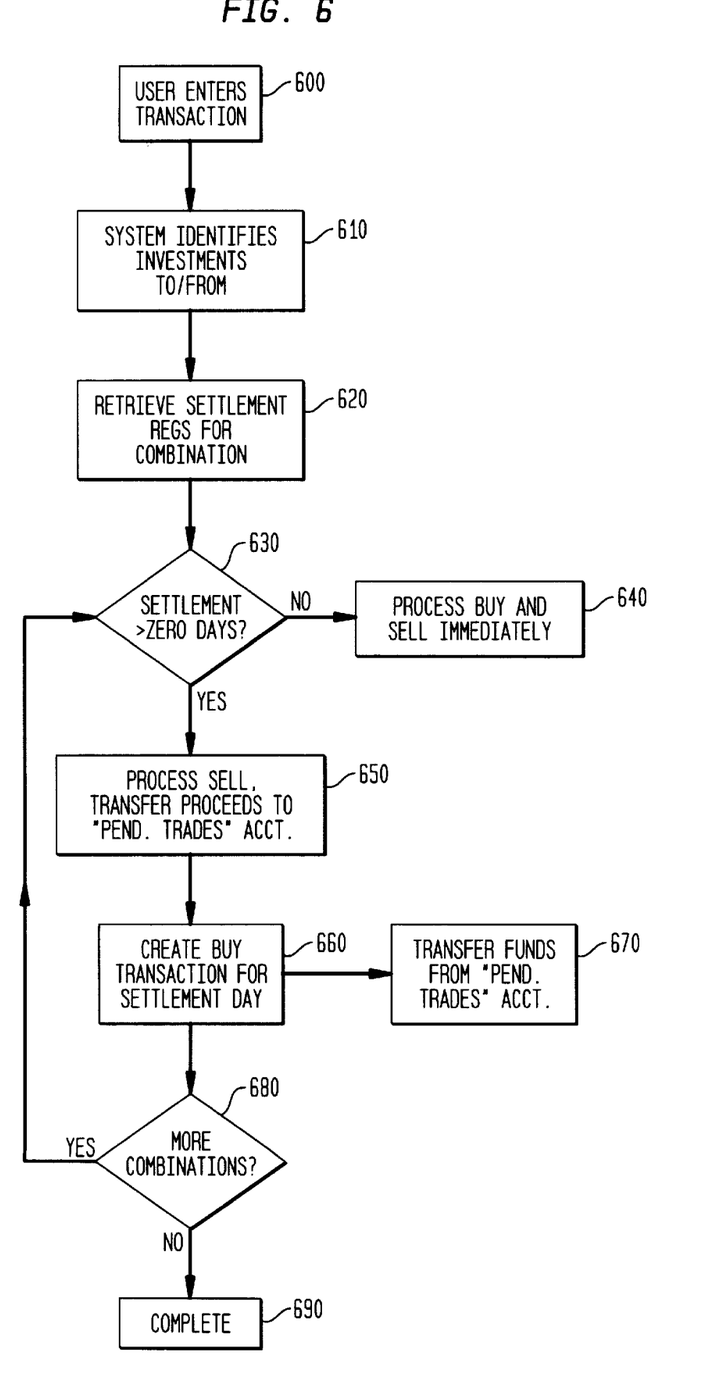
FIG. 6 is a functional schematic flowchart of the system submodule for processing transactions including different settlement periods.

The system of the present invention eliminates this pending trades problem with a unique automatic trading system (block 210, FIG. 2; see FIG. 6) that automatically scans all transactions and resolves the settlement problem by "pending" any purchases that cannot take place on the same day as the sales that fund them. When a user enters a transaction (block 600), the system identifies the investments that are being bought and sold (block 610) and then retrieves the settlement regulations from a table described below for the combination of investments in the transaction (block 620). If the settlement period retrieved from the table is zero days (block 630), the buy and sell portions of the transaction are processed immediately (block 640). If the settlement period retrieved from the table is longer than zero days, the system intercepts the transfer transaction and changes it to direct the funds to the "Pending Settlement" fund (block 650). For the stock-to-mutual fund example above, the participant's records would be updated with the sale of the stock and a purchase of a holding fund called "Pending Settlement," which exists only in the records of the financial institution. When the proceeds of the sale become available to the plan (i.e., the sale has settled), the system automatically creates and posts to the records another transfer transaction (block 660) that moves the funds out of "Pending Settlement" and into the investment that the participant has chosen to purchase (block 670), which is stored by its investment code in the participant's history records. The system continues to check the settlement differences in a transaction until they are all checked (block 680). When all fo the settlement differences in a transaction have been checked, this phase of the processing is completed (block 690). Because the funds are on the books in the "Pending Settlement" fund in the interim, the financial institution does not have to fund earnings on investments that are not accumulating any earnings in the plan trust account, as would be the case without the present system.

The pending trades aspect of the system gives the plan administrator the comfort to add multiple investment types with various market settlement periods, without the fear of creating financial loses by having to update participant records prior to updating the plan assets. To help accomplish this, the system includes a table containing all possible combinations of "from fund" and "to fund" settlement periods, and the associated delay when moving money from one to the other. For example, the settlement period for selling stock might be three days, but if the transfer is from a stock to a stock, the settlement might only be one day. In a stock-to-stock transfer, the system would retrieve a settlement period of one day and process the buy and sell appropriately.

VII. Unexecuted Trades

In standard brokerage accounts, investors often sell several different investments at the same time. Occasionally, one of the investments requested to be sold does not trade in the market on that particular day. In that case, the broker in charge of the account simply sells the investments that are traded and holds onto the remaining investments until a later day when those investments are traded. With benefits plans, which are primarily invested in mutual funds, money market funds and company stock funds, it is extremely unlikely that such investments are not traded on any given day. Thus, existing benefits processing systems are specifically designed to generate an error when a user attempts to enter a transaction involving an investment without a price, i.e., one that did not trade on that day. If the range of available investments were expanded with existing systems, participants would be frequently blocked from receiving a disbursement or making a trade due to the error generated by the system.

With the availability of all investments in the present system, it was necessary to overcome this problem. Thus, if any investment contained within a transaction in the present system does not trade on the transaction date, the unexecuted trades submodule (block 220, FIG. 2) of the system automatically extracts that investment from the transaction and processes the remaining investments. In that way, the participant is able to receive as much of the disbursement as possible as quickly as possible. The investment that does not trade remains in the account awaiting execution. The system then automatically generates a separate transaction in the participant's account for that particular investment. In the preferred embodiment, a report is generated for the plan administrator identifying the investment or investments that failed to trade. The administrator is then able to resubmit the newly created transaction upon receiving notification that the investment will sell in the market. It is also contemplated that the system will automatically reattempt the newly created transaction on a daily basis until the investment trades and the transaction is completed.

VIII. Investment Commissions

There is no capability for handling tiered commission schedules built into the existing systems. For plans that do not use the present system, the commissions (calculated as a fixed number of cents per share) are factored into the share trading price automatically by the system. For plans that do use the system of the present invention, including dollar cost averaging, this method becomes impractical, considering the large number of transactions that involve fractional shares and multiple investments. The system of the present invention thus includes a new automatic transaction for calculating commissions. One key to this processing submodule is the flexibility to calculate commissions according to several different possible schedules. These schedules are normally set up so that the higher volume in a particular trade lowers the commission rate per share. Normally, however, most processes of the system are only concerned with one investment-money source combination in a transaction at a time. However, the new commissions submodule is designed to aggregate the commissions across money sources. The submodule aggregates all the transactions that occurred on a particular investment for a particular participant and then calculates the commission based on the preprogrammed schedules. This lowers the overall commission rate for the participant, generating significant savings for him/her, without any detriment to the financial institution.

Figure 2:
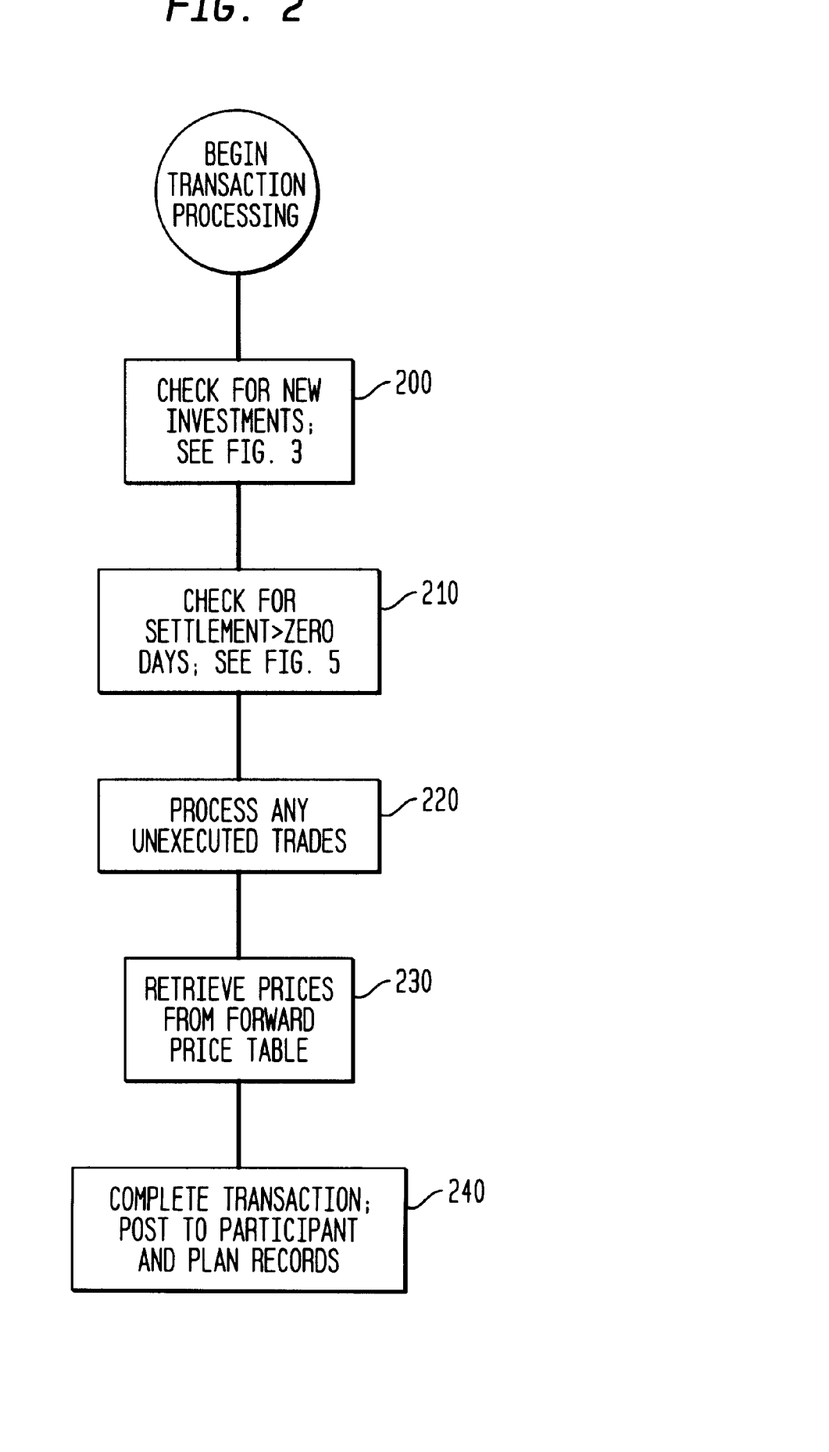
FIG. 2 is a functional schematic flowchart showing certain subprocesses within the system of the present invention during transaction processing.

Thus, the system of the present invention is able to handle all investments and make them available to plan participants. The system also provides the necessary processing needed to support transactions with those investments and to automate the otherwise impractical recordkeeping functions created by allowing access to all investments. Through a sample transaction process, as shown in FIG. 2, which illustrates some of the system submodules that operate on a per-transaction basis, it can be seen that the system of the invention provides a unique benefits processing system with signficant advantages over existing systems.

While the embodiments shown and described are fully capable of achieving the objects and advantages of the invention, it is to be understood that the embodiments are described herein solely for the purpose of illustration and not for purposes of limitation, the invention being limited solely by the claims.

We claim:

1. In a data processing system for transaction processing and recordkeeping with respect to a benefits plan:

means for storing a list of available investments, each of said investments having a unique identifier, said identifier being selected from a set of identifiers, all having a similar format, said format being encoded as a two-byte binary code indicative of one of said available investments; and means for converting and displaying said two-byte binary code as a value indicative of said available investment in a manner intelligible to a user of said data processing system.

2. In the system of claim 1, said system further comprising multiple plans and further comprising:

means for storing an investment table for each of said plans, each of said investment tables having information on all of said investments within the respective plan.

3. In the system of claim 2, further comprising:

means for automatically copying the information relating to a particular investment from said means for storing a list to said means for storing an investment table when a participant requests a transaction involving said particular investment and said particular investment's information is not yet stored in said means for storing an investment table.

4. In the system of claim 2, further comprising:

a forward price table for each of said plans, said price table being updated on each trading day, said price table containing the last trading price from the previous day for all of the investments held within the respective plan such that intra-day calculations based on transactions processed during the day will be based on prices contained in said price table.

5. In a data processing system for transaction processing and recordkeeping with respect to a benefits plan having participants invested in a plurality of investments, said investments being of various types, the improvement comprising:

means for storing the settlement periods for investments within said plan;

means for analyzing a transaction to determine a first investment to be sold and a second investment to be bought;

means for retrieving the settlement period for said combination of first and second investments from said means for storing;

means for automatically delaying said second investment from being bought until the end of the settlement period for said first investment if said settlement period is longer than a predetermined duration.

6. In the system of claim 5, wherein said means for automatically delaying will record the purchase of a dummy investment until the end of said settlement period such that said participant will gain no earnings during said settlement period.

7. In the system of claim 5, the improvement further comprising:

means for processing corporate actions, said means for processing including means for storing information on corporate actions with respect to investments with said plan;

means for storing participant's responses to said actions; and means for automatically generating a transaction according to a participant response.

8. In the system of claim 7, the improvement further comprising:

a dividend processing table containing dividend information for all investments within a particular plan; and a dividend selection table containing information for each participant within said plan concerning such participant's instructions regarding the distribution of dividends for said investments.

9. In a data processing system for transaction processing and recordkeeping with respect to a benefits plan having participants invested in a plurality of investments, the improvement comprising:

means for filtering a requested transaction on a particular day, said transaction involving multiple investments, said means for filtering including means for parsing said transaction into at least two transactions if any of said multiple investments is not trading on said particular day, one of said two transactions including said non-trading investment and being delayed until said investment is traded.

10. A system for transaction processing and recordkeeping with respect to a benefits plan, comprising:

computer data processing means for processing data;

data storage means for storage and retrieval of data;

means for storing in said data storage means a list of available investments, each of said investments having a unique identifier, said identifier being selected from a set of identifiers, all having a similar format, said format being encoded as a two-byte binary code, and means for converting said and displaying said two-byte binary code as a value indicative of said available investment in a manner intelligible to a user of said data processing system.

11. A system for transaction processing and recordkeeping with respect to a benefits plan having participants invested in a plurality of investments, said investments being of various types, comprising:

computer data processing means for processing data;

data storage means for storage and retrieval of data;

means for storing the settlement periods in said data storage means for investments within said plan;

said computer data processing means analyzing a transaction to determine a first investment to be sold and a second investment to be bought;

means for retrieving the settlement period from said data storage means for said combination of first and second investments from said data storage means;

means for automatically delaying said second investment from being bought until the end of the settlement period for said first investment if said settlement period is longer than a predetermined duration.

12. A system for managing a plurality of individual benefits accounts wherein each account corresponds to a participant, the system comprising:

a means for storing a list of investments available to participants;

a price table, said price table being updated periodically and containing the latest trading price for the investments available to participants;

a means for purchasing an investment and automatically adding the investment to a participant's plan upon request of a participant; and a means for calculating the commission price for investments purchased by a participant.

13. The system of claim 12, further comprising:

a means for receiving dividend information or dividend amounts for investments held by plan participants; and a means for storing a participant's instructions regarding the treatment of dividends; and a means of distributing dividends according to the participant's instructions.

14. The system of claim 13, further comprising:

a means for selling investments in a plan;

a means for analyzing a transaction to determine the total amount needed in a participant's plan to purchase investments indicated in the transaction;

a means for storing the settlement period for investments within a plan; and a means automatically delaying a purchase of an investment until there are sufficient funds in a participant's account to purchase the investment.

15. The system of claim 14, further comprising:

a means for receiving and processing corporate actions, said means for processing including means for storing information on corporate actions with respect to investments held in the various participant plans;

a means for storing a participant's responses to, or instructions regarding, corporate actions; and a means for automatically generating an action in accordance to a participant's response to, or instructions regarding, corporate actions.

16. The system of claim 15, further comprising:

a means for analyzing a requested transaction on a particular day involving multiple investments, and a means for delaying a transaction of an investment which is not trading on that particular day.

* * * * *